United States Patent

Chen et al.

[11] Patent Number: 5,324,894
[45] Date of Patent: Jun. 28, 1994

[54] MULTIPLE WEIGHING APPARATUS FOR MASS MATERIALS WITH DUAL-ACTING HOPPER GATES MECHANISM

[75] Inventors: Kuan-Chou Chen; Long-Iong Wu, both of Hsinchu, Taiwan

[73] Assignee: Industrial Technology Research Institute, Hsinchu, Taiwan

[21] Appl. No.: 24,522

[22] Filed: Mar. 1, 1993

[51] Int. Cl.⁵ .................. G01G 13/16; G01G 13/34
[52] U.S. Cl. .................. 177/25.18; 177/112
[58] Field of Search .................. 177/105–109, 177/111–113, 25.18

[56] References Cited

U.S. PATENT DOCUMENTS

| | | | |
|---|---|---|---|
| 490,710 | 1/1893 | Hartley | 177/112 |
| 4,527,647 | 7/1985 | Ueda | 177/105 |
| 4,542,869 | 9/1985 | Brine | 244/216 |
| 4,549,619 | 10/1985 | Fujiwara | 177/112 X |
| 4,705,125 | 11/1987 | Yamada et al. | 177/25.18 |
| 4,874,048 | 10/1989 | Kawanishi et al. | 177/108 X |
| 4,947,946 | 8/1990 | Konishi et al. | 177/114 X |

Primary Examiner—George H. Miller, Jr.
Attorney, Agent, or Firm—W. Wayne Liauh

[57] ABSTRACT

A multiple weighing apparatus with dual acting hopper gates mechanism comprises a feeding device conveying articles to be weighed and packed to a weighing section of the apparatus. The articles which are transferred into the weighing section are weighed and a portion of which having a desired weight is then allowed to move into a packing section to be packed therein. Each pack of the articles will have a desired weight. The weighing section comprises a plurality of pool hoppers and weighing hoppers controlled by a central controller. Each of the hoppers comprises a body having therein a space for receiving the articles and a discharge port closable by two gates. A Stephenson III type six-bar mechanism is adapted to operate the gates with the gates being the output links thereof. A pushing rod which is controlled by the central controller is used to move the input link of the six-bar mechanism to open the gates. A returning spring is provided in ,such a way that when the gates are opened, potential energy is stored therein and when the pushing rod is retracted back, the potential energy of the spring is released to move the gates back to the closed position.

6 Claims, 7 Drawing Sheets

MULTIPLE WEIGHING APPARATUS FOR MASS MATERIALS WITH DUAL-ACTING HOPPER GATES MECHANISM

FIELD OF THE INVENTION

The present invention relates generally to a multiple weighing apparatus and in particular to such an apparatus with dual-acting hopper gates operated by a six-bar linkage, especially a Stephenson III type mechanism.

BACKGROUND OF THE INVENTION

Many industries require packing bulk materials into packages of different sizes to enhance storage, transportation and sales. A typical example of such industries is the food industry which usually sells products, such as candies, frozen foods in pack. In these industries, weighing machines are adapted to provide a weight measurement for packing articles. The weighing machines now in use are automatic apparatus in order to save labor and time consumed in measurement.

One of the common weighing machines now in use comprises a plurality of weighing units (so that it is referred to as multiple weighing apparatus) which measure the weights of separate batches of articles supplied from a supply source. A control device which may be operated by a micro-processor or similar electronic device computes the combination of weight values obtained from the weighing units and selects a best combination therefrom which is equal to or very close to a pre-set reference weight value to discharge the articles contained in the weighing units which together provide the best combination. The discharged articles which have in total a weight very close to a desired value are then packed.

In such an automatic weighing machine, each of the weighing units comprises a weighing hopper for accommodating therein a batch of articles, the weight of which is sensed by the weighing unit and a pool hopper for quickly supplying articles to the weighing hopper. Each of the hoppers is equipped with a gate to be operated by a four-bar linkage which is in turn controlled by the control device to open or close the gate and thus allowing the articles therein to pass therethrough.

An example of the above type automatic weighing machines is disclosed in U.S. Pat. No. 4,545,446, issued to Rihei Kokabu on Oct. 8, 1985. The automatic weighing machine disclosed in this patent, however, possesses several disadvantages. For example, since there is only a single gate controlled by a four-bar linkage, a strong impact occurs between the gate and the hopper body when the gate is closed to the end. Vibration is also easy to induce in such a four-bar design.

It is therefore the purpose of the present invention to provide an automatic multiple weighing machine of such a type, each weighing unit of which has a dual-acting hopper gates controlled by a six-bar linkage, especially a Stephenson III type linkage, so as to overcome the deficiencies of the prior art automatic multiple weighing machines.

SUMMARY OF THE INVENTION

It is therefore the principle object of the present invention to provide a multiple weighing apparatus having a plurality weighing units with dual hopper gates operated by a six-bar linkage.

It is also an object of the present invention to provide a multiple weighing apparatus having a plurality of weighing units in combination with dual gate hoppers, the hopper gates being operated by a six-bar linkage in a synchronous fashion to increase the opening of the discharge port thereof.

It is also an object of the present invention to provide a multiple weighing apparatus comprising hoppers of dual gates operated by a six-bar linkage in order to reduce the vibrations or impacts induced in the prior art four-bar linkage operating hopper gate design.

It is a further object of the present invention to provide a multiple weighing apparatus having hoppers of dual gates controlled by a Stephenson III type six-bar linkage wherein the closed position of the gates is one of the dead points of the six-bar linkage so that the gates will not be accidently opened by the weights thereof and the weights of the articles disposed therein.

To achieve the above-mentioned objects, there is provided an automatic weighing apparatus with dual-acting hopper gates mechanism comprising a feeding device conveying articles to be weighed and packed to a weighing section of the apparatus. The articles which are transferred into the weighing section are weighed and a portion of which having desired weight is then allowed to move into a packing section to be packed therein. Each pack of the articles will have a desired weight. The weighing section comprises a plurality of pool hoppers and weighing hoppers controlled by a central controller. Each of the hoppers comprises a body having therein a space for receiving the articles and a discharge port closable by two gates. A Stephenson III type six-bar mechanism is adapted to operate the gates with the gates being the output links thereof. A pushing rod which is controlled by the central controller is used to drive the input link of the six-bar mechanism to open the gates. A returning spring is provided in such a way that when the gates are opened, potential energy is stored therein and when the pushing rod is retracted back, the potential energy of the spring is released to move the gates back to the closed position.

BRIEF DESCRIPTION OF THE DRAWINGS

The above and other objects and advantages of the present invention will be readily apparent from the following description of a preferred embodiment taken in connection with the accompanying drawings, wherein.

DETAILED DESCRIPTION OF THE PREFERRED EMBODIMENTS

Figure 1:
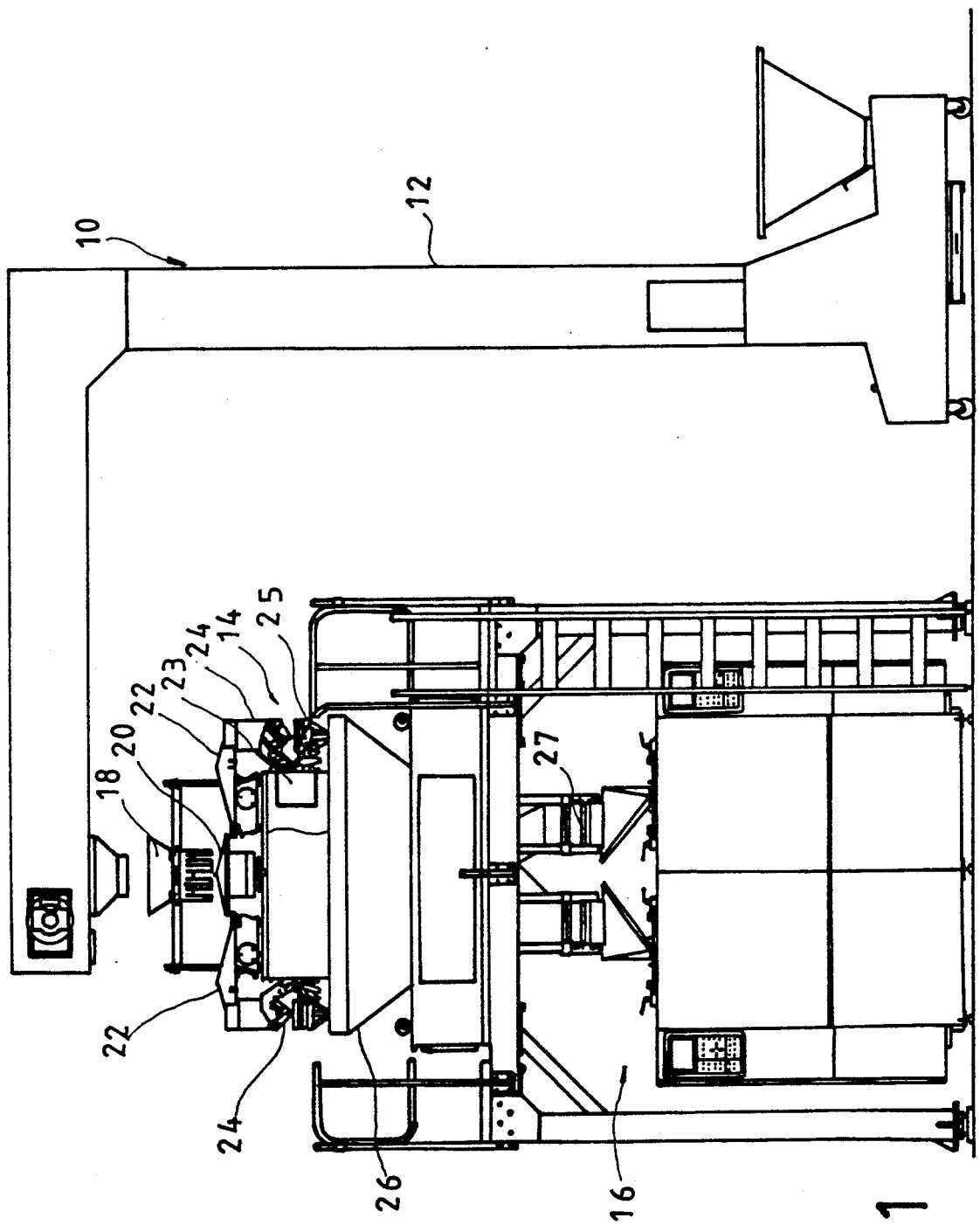
FIG. 1 is a side elevational view showing the general features of an automatic multiple weighing apparatus in which hoppers with dual gates constructed in accordance with the present invention are adapted.

With reference to the drawings and in particular to FIG. 1, wherein a multiple weighing apparatus 10 is shown, the multiple weighing apparatus 10 comprises a weighing section 14 and a packing section 16 disposed generally under the weighing section 14. An article feeder means 12 conveys articles (not shown) to be weighed and packed to above the weighing section 14 to allow the articles to fall into the weighing section 14 of the weighing apparatus 10. The articles which have a pre-set total weight are then allowed to fall into the packing section 16 under the control of a central controller (not shown) to be packed therein.

The articles, once conveyed to above the weighing section 14, fall onto a vibrating dispersion feeder 20 through an inlet chute 18. The vibration of the dispersion feeder 20, which may be provided by any known vibration actuation means, moves the articles thereon towards the periphery thereof through which the articles fall into radial feeders 22. The radial feeders 22 are also vibrated by vibrating means to help moving the articles from the inner edges thereof from which the articles are received to the opposite outer edges thereof and the articles are then allowed to leave the radial feeders 22 and fall into a plurality of pool hoppers 24.

The articles received in the pool hoppers 24 are then discharged into a plurality of weighing hoppers 25 each of which is respectively corresponding to one of the pool hoppers 24 and in connection with a weighing unit (not explicitly shown in the drawings) to have the weight of the articles within each of the weighing hoppers 25 measured. Once the sum of at least one of the measured values, which are the weights of the articles contained in the weighing hoppers 25, is equal to or very close to a predetermined reference, a drive unit 23 will be energized to open the selected weighing hoppers 25 and thus allowing the articles contained in the selected weighing hoppers 25 with the total weight thereof equal to or very close to the predetermined reference value to fall into timing hoppers 27 through an article discharge chute 26.

The so collected articles are then allowed to enter into the packing section 16 to be packed therein.

The present invention is related to the hopper structure and the controlling mechanism thereof only and thus the detail of the weighing apparatus other than the hopper structure will not be further discussed herein. Those interested in the overall structure of the weighing apparatus may also consult the above-mentioned U.S. Pat. No. 4,545,446 and other related documents.

In the following, a detailed description of a preferred embodiment of the hopper structure and the controlling mechanism thereof constructed in accordance with the present invention will be given with particular reference to FIGS. 2, 3 and 4. However, it should be noted that variations and. modifications without departing from the scope of the present invention can be embodied by those skilled in the art and thus the description of the preferred embodiment is illustrative only, not to limiting the scope of the present invention which is more clearly and precisely defined in the appended claims.

It should also be noted that since the construction of the weighing hoppers 25 is similar to that of the pool hoppers 24, the description of the present invention will be directed to the pool hoppers 24 only and the same will be applicable to the weighing hoppers 25.

Figure 2:
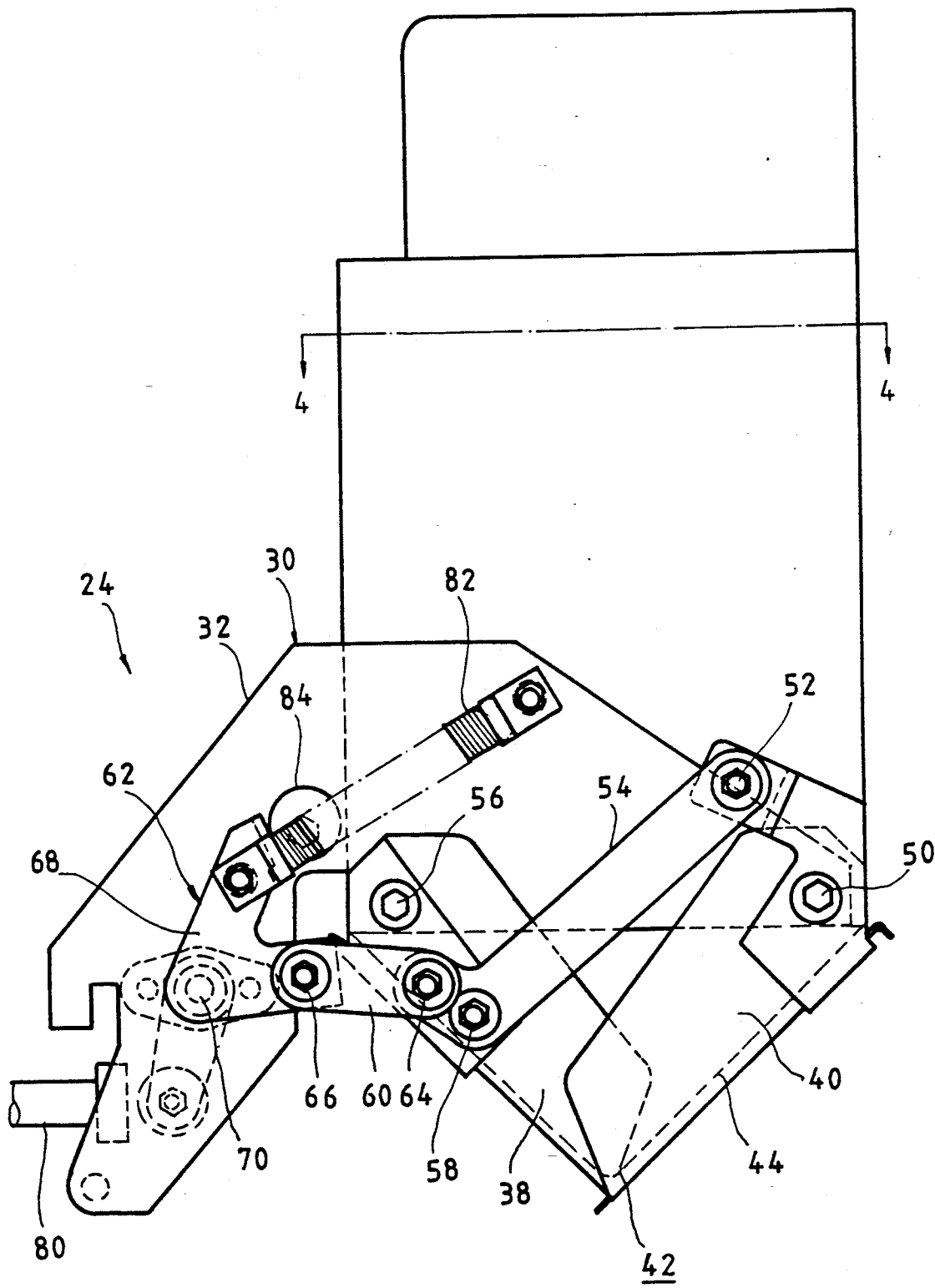
FIG. 2 is a front view of a dual gate hopper made in accordance with the present invention and adapted in the automatic weighing apparatus shown in FIG. 1 to be operatively in combination with one of the weighing units of the multiple weighing apparatus, in which the hopper gates are in the closed position.
Figure 3:
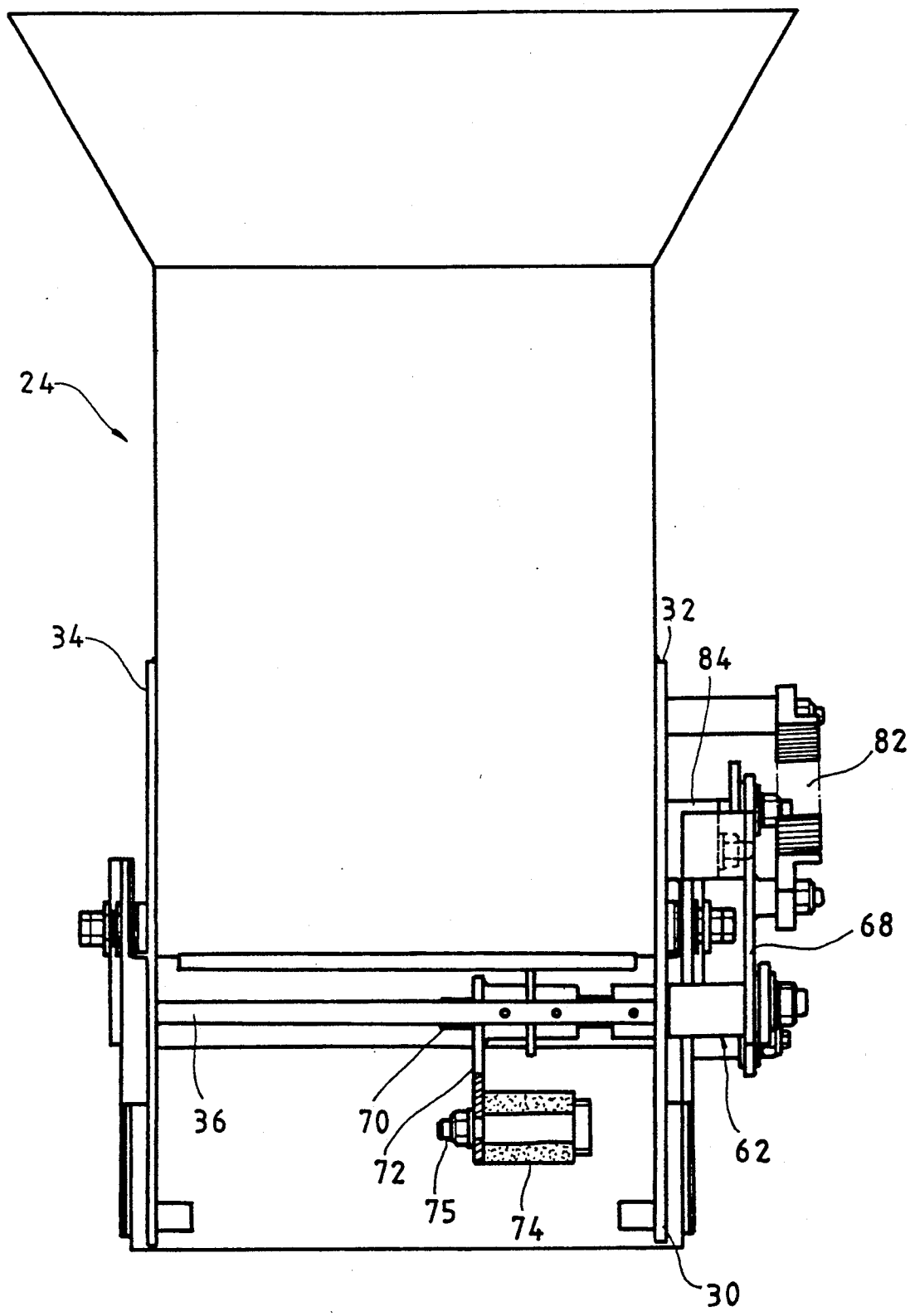
FIG. 3 is a side elevational view of the hopper shown in FIG. 2
Figure 4:
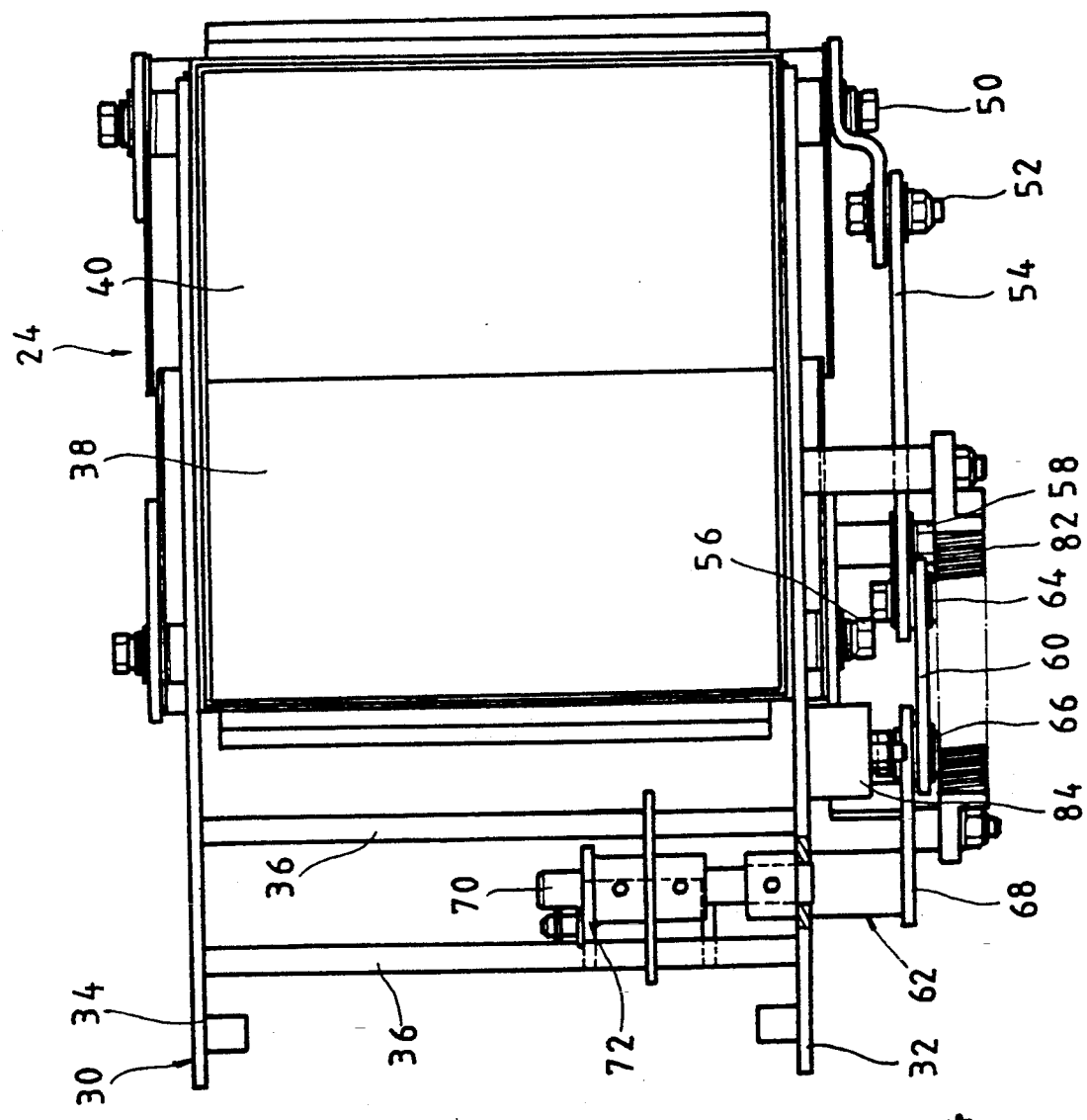
FIG. 4 is a cross-sectional view taken along line A—A of FIG. 2.

Referring to FIGS. 2, 3 and 4, in which a preferred embodiment of the pool hoppers 24 is shown, the pool hopper 24 comprises a hopper body 30, preferably constituted by a pair of opposite plate members 32 and 34 connected together by a plurality of connecting rods 36, for example two connecting rods 36 as shown in FIG. 4, to define a space therebetween, serving as a container for receiving therein the articles. On the lower end of the two plates 32 and 34, a discharge port 42 is defined to provide a passage for the articles contained therein to pass and thus falling off the hopper body 30. The discharge port 42 is closable by a pair of gates 38 and 40 which are pivotally mounted on the plates 32 and 34 along pivoting axes 50 and 56. The gates 38 and 40, which will be respectively referred to as the rear gate 38 and the front gate 40, are operated by a six-bar mechanism which will be discussed in detail hereinafter to close and open the discharge port 42 under the control of the central controller and the drive unit 23.

To completely close the discharge port 42, the plates 32 and 34 that constitute the hopper body 30 may each have a downward triangular extension 44 as that shown in drawings under which the gates 38 and 40 are movably mounted. The gates 38 and 40 may assume a U-shaped cross section so as to fit over and thus completely sealing the discharge port 42 when the gates 38 and 40 contact the triangular extensions 44. These, however, are choices of design and thus will not be further discussed.

Figure 5:
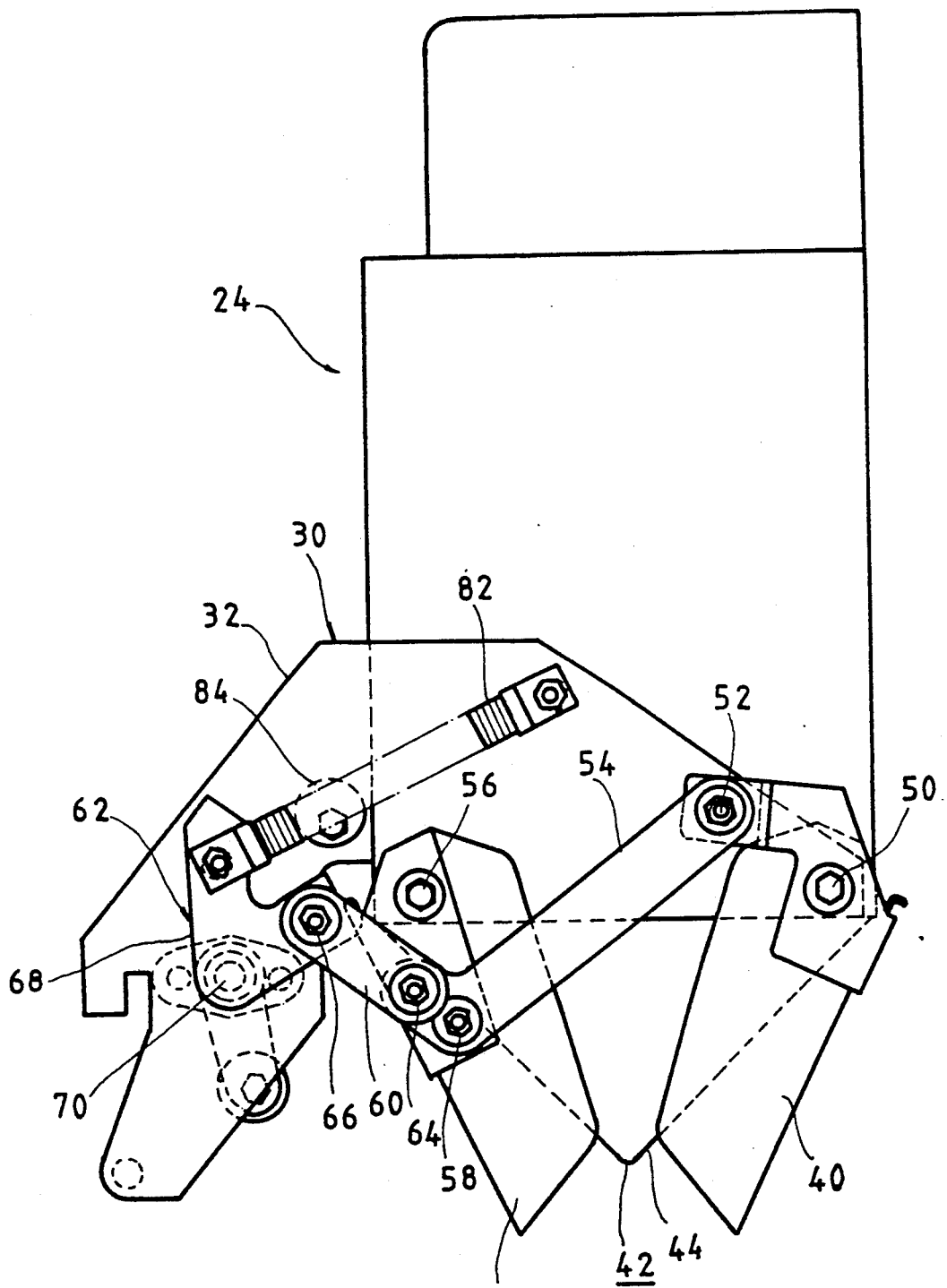
FIG. 5 is a front view showing the partial opening situation of the hopper shown in FIG. 2.
Figure 6:
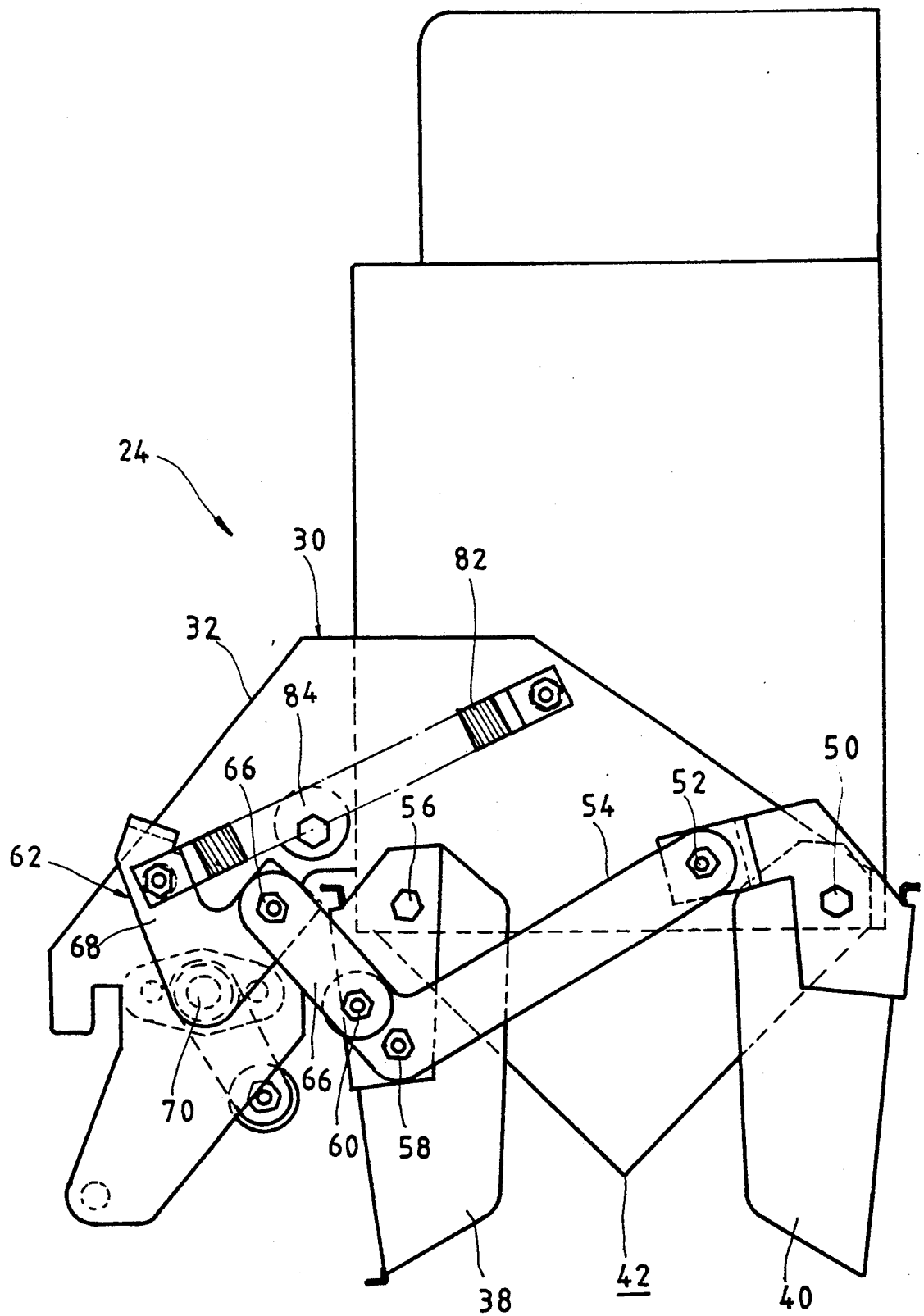
FIG. 6 is a front view showing the fully opening situation of the hopper shown in FIG. 2.

FIGS. 2, 5 and 6 show in sequence the opening of the gates 38 and 40 which are rotatable between a closed position (FIG. 2) and an open position (FIG. 6). FIG. 5 shows a partially opened situation. It can be observed that with a similar amount of rotation of the gates, a partial opening of the gates 38 and 40 can provide a passage larger than the prior art construction which has only one gate.

Figure 7:
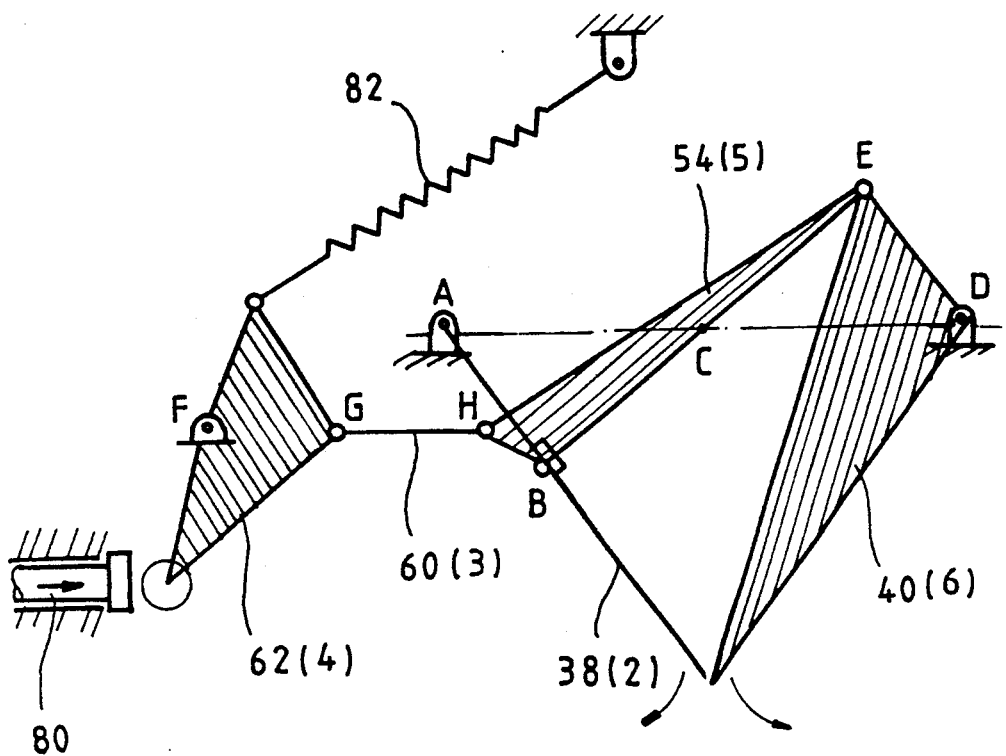
FIG. 7 is a schematic view showing the Stephenson type six-bar mechanism adapted in the present invention.
Figure 8:
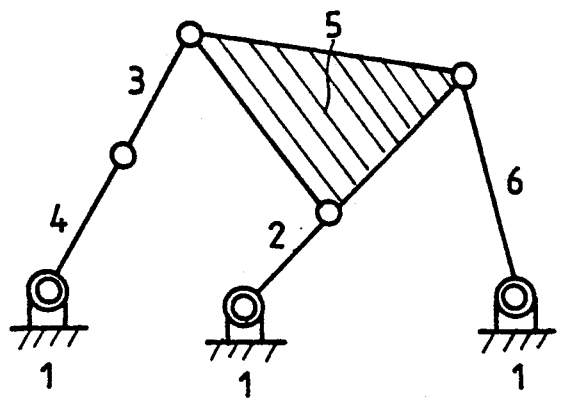
FIG. 8 shows the standard diagram of the Stephenson III six-bar linkage.

The controlling six-bar mechanism of the gates 38 and 40 is schematically shown in FIG. 7 which is preferably a Stephenson III type six-bar linkage. FIG. 8 shows a standard diagram of the Stephenson III linkage wherein reference numerals 1-6 respectively designate the six "bars" of the linkage. These reference numerals 1-6 are also shown in FIG. 7 within parentheses as a reference. In FIG. 8, link 1 is the fixed link corresponding to the hopper body 30. Link 4 is the input link. Links 2 and 6 are the output links respectively corresponding to the rear gate 40 and the front gate 38. Links 3 and 5 are intermediate links. With an input action occurring on the input link 2, output actions will consequently occur at output links 2 and 6 which indicates opening and/or closing the gates 38 and 40.

The detail of the six-bar linkage shown in FIG. 8 can be obtained by consulting text books of mechanisms and thus will not be given herein.

Referring now to FIGS. 2-8, the front gate 40 (link 6 of FIG. 8) is pivotally connected to the hopper body 30 by the pivot 50 and is also pivotally connected to a bell crank 54, which corresponds to link 5 of FIG. 8, via a pivot 52. On the other hand, the rear gate 38 (link 2 of FIG. 8) is pivotally connected to the hopper body 30 and the bell crank 54 respectively by the pivot 56 and a pivot 58. A connection member 60, which corresponds to link 3 of FIG. 8, is respectively pivotally connected, via pivots 64 and 66, to the bell crank 54 and a follower crank assembly 62 which is the input member of the linkage and thus corresponds to link 4 of FIG. 8. With such an arrangement, the movement of the follower crank assembly 62 will be transmitted to the gates 38 and 40 by moving and rotating the connection member 60 and the bell crank 54.

With reference to FIGS. 2, 3 and 4, in the embodiment illustrated, the follower crank assembly 62 comprises a crank 68, a support pivot 70, a rocking arm 72 and a push ring 74. The crank 68 is pivotally mounted to the hopper body 30 by the support pivot 70 and the rocking arm 72 is integrally mounted to the support pivot 70 while the push ring 74 is rotatably connected to the rocking arm 72 by means of a bolt 75 so that when the push ring 74 is contacted and moved forward by a pushing rod 80 (see FIG. which is in turn actuated by the drive unit 23 under the control of the central controller, the support pivot 70 is rotated by the rocking arm 72 with respect to the hopper body 30 so as to rotate and thus move the crank 68. The movement of the crank 68 will, as mentioned previously, be transmitted to the gates 38 and 40 via the six-bar mechanism to open the gates 38 and 40.

The above describes the construction and operation of the hopper made in accordance with the present invention. In an other aspect of the present invention, it is desired to have the pivots 70, 64 and 66 (namely, points F, G and H of FIG. 7) collinear when the gates 38 and 40 are completely closed, namely at the closed position shown in FIG. 2. Since the collinearity of points F, G and H indicates that the six-bar linkage is at one of the dead points thereof, the closed gates 38 and 40 will not be unexpectedly opened by the weight of the articles contained in the hopper body 30 and own weights of their own.

Further, to have the gates 38 and 40 opened in a synchronous fashion, it is desired to have the two gates 38 and 40 have the same rotational radius about respective pivots 50 and 56. This corresponds to the situation shown in FIG. 7 that the distance between points A and B is equal to the distance between points D and E. Further, the intersection point C between the line connecting points B and E and the line connecting points A and D should be located at such a position to be equally distant from points A and D in order to open and close the gates 38 and 40 in a synchronous fashion, to reduce the time required to open and close the gates 38 and 40 and to reduce the magnitudes of the impacts and vibrations during opening and closing of the gates 38 and 40.

The pushing rod 80 is movable between a first position corresponding to the closed position of the gates 38 and 40 and a second position corresponding to the open position of the gates 38 and 40 in order to open and close the gates 38 and 40 under the control of the drive unit 23 and the central controller.

A returning spring 82 may be connected between the hopper body 30 and the crank 68 in such a way that when the gates 38 and 40 are opened, the spring 82 undergoes elastic deformation to store therein a certain amount of potential energy. And thus when the gates 38 and 40 are fully opened (as shown in FIG. 6) by actuating the pushing rod 80 to move the push ring 74 and the pushing rod 80 is then retracted back to the first position thereof to release the gates 38 and 40, the gates 38 and 40 will return to and maintain at the closed position shown in FIG. 2 by the internal energy of the spring 82.

A stopper 84 may be provided at a suitable position on the hopper body 30 so that when the gates 38 and 40 are completely closed by the springs 82, further rotation of the crank 68 is stopped by the stopper 84.

It is apparent that although the invention has been described in connection with the preferred embodiment, it is contemplated that those skilled in the art may make changes to certain features of the preferred embodiment without altering the basic concept of the invention and without departing from the spirit and scope of the invention as defined in the appended claims.

What is claimed is:

1. A multiple weighing apparatus comprising a weighing section and a packing section, a feeder means conveying articles which are to be weighed in the weighing section and packed in the packing section into the weighing section, a central controller means controlling the weighing section to allow an amount of the articles having a total weight equal to or close to a pre-determined value to enter into the packing section to be packed therein into packs of a desired weight, said weighing section comprising a plurality of pool hoppers and weighing hoppers which are respectively in connection with a plurality of weighing units in electrical connection with the central controller so as to weigh the articles contained in said weighing hoppers under the control of said central controller, wherein each of said pool hoppers comprises:

a hopper body defining therein a space for receiving the articles and having a discharge port;

a front gate and a rear gate pivotally mounted on said hopper body by a first pivot and a second pivot to be rotatable between a closed position and an open position so as to cooperatively close or open said discharge port;

a six-bar linkage, comprising a fixed link, an input link, two output links and two intermediate links with said hopper body being the fixed link and said gates being the output links, said intermediate links comprising a bell crank pivotally connected to said gates by a third and a fourth pivots and a connection member pivotally connected to said bell crank by a fifth pivot, the input link being a crank pivotally mounted on said hopper body by means of a support pivot, said crank being pivotally connected to said connection member by a sixth pivot, said support pivot comprising a push ring rotatably mounted thereon by a rocking arm so that when said push ring is contacted and thus moved by a pushing rod controlled by said central controller to move from a first position in which said gates are at the closed position to a second position in which said gates are at the open position, said support pivot rotates said crank and thus moving said six-bar linkage to have said gates rotated about the first and the second pivots to open said discharge port; and returning means which moves said gates back to the closed position when said pushing rod is moved from the second position back to the first position.

2. An apparatus as claimed in claim 1, wherein said hopper body comprises two opposite plate members connected together by a plurality of connecting rods to define therebetween said space for receiving therein the articles.

3. An apparatus as claimed in claim 1, wherein said returning means comprises a spring mounted between said hopper body and said crank so that when said gates are opened, said spring undergoes elastic deformation to store therein potential energy for moving said gates back to the closed position.

4. An apparatus as claimed in claim 1, wherein the six links of said six-bar linkage have such dimensions that when said gates are at the closed position, said support pivot, said fifth pivot and said sixth pivot are collinear and thus the closed position of said gates corresponds to a dead point of said six-bar linkage.

5. An apparatus as claimed in claim 1, wherein said first pivot is located at a first distance from said third pivot and said second pivot is located at a second distance from said fourth pivot, said first distance being equal to said second distance and wherein said first pivot and said second pivot constitute a first line and said third pivot and said fourth pivot constitute a second line which intersects the first line at an intersection point which is equally distant from said first pivot and said second pivot.

6. An apparatus as claimed in claim 1, wherein said six-bar linkage is a Stephenson III type six-bar linkage.

* * * * *